United States Patent
Machida

[19]

[11] Patent Number: 6,033,180

[45] Date of Patent: Mar. 7, 2000

[54] ROTOR BLADE WITH A ROTARY SPOILER

[75] Inventor: Shigeru Machida, Utsunomiya, Japan

[73] Assignee: Fuji Photo Kabushiki Kaisha, Tokyo, Japan

[21] Appl. No.: 09/006,154

[22] Filed: Jan. 13, 1998

[30] Foreign Application Priority Data

Feb. 7, 1997 [JP] Japan .................................. 9-024884

[51] Int. Cl.[7] .................................................. B64C 27/615
[52] U.S. Cl. ............................................ 416/23; 244/215
[58] Field of Search ........................ 416/23, 24; 244/213, 244/215, 17.25, 199, 216, 217

[56] References Cited

U.S. PATENT DOCUMENTS 2,852,211  9/1958  Xenakis .................................. 244/213
5,209,438  5/1993  Wygnanski ............................. 244/199
5,639,215  6/1997  Yamakawa et al. .................... 416/23
5,712,524  1/1998  Suga ...................................... 310/328

*Primary Examiner*—Edward K. Look
*Assistant Examiner*—Richard Woo
*Attorney, Agent, or Firm*—Smith, Gambrell & Russell, LLP

[57] ABSTRACT

A rotor blade is provided with rotary spoilers rotatably supported in recesses formed in a blade body, respectively, so that the upper surface of each rotary spoiler serves as a portion of the wind surface of the rotor blade. Each rotary spoiler is turned so as to protrude from the wing surface of the blade body to make the rotary spoiler exercise its function when the rotor blade is turned to an appropriate rotary angular position to control noise and vibrations by changing the lift of the rotor blade. Each rotary spoiler is driven for turning by a driving mechanism having a driving member made of a piezoelectric material, and the operation of the driving mechanism is controlled by a controller.

11 Claims, 5 Drawing Sheets

LIFT DISTRIBUTION ON A ROTOR BLADE

ROTOR BLADE WITH A ROTARY SPOILER

BACKGROUND OF THE INVENTION

1. Field of the Invention

The present invention relates to a rotor blade provided with rotary spoilers and capable of controlling to reduce noise and vibration by disturbing airstream around the wing surface of the rotor blade to vary a lift of the rotor blade.

2. Description of the Related Art

Referring to FIG. 7, a helicopter is controlled to fly by a mechanical linkage 14 of a rotor 13, including an upper swash plate 10, a lower swash plate 11 and a pitch link 12. Efforts have been made to meet progressively increasing demand for reducing vibration and noise of the helicopter through the research and development of techniques for actively controlling a pitch of the rotor 13 in a higher frequency range.

U.S. Pat. No. 4,519,743 discloses a technique called an individual blade control method (IBC method) which is intended to achieve a high level control through not a swash plate but a hydraulic control of the respective rotor blade at the base end of each rotor blade. As mentioned in U.S. Pat. No. 5,224,826 studies have started from a rotor provided with a flap using a piezoelectric material, capable of efficiently working under the influence of a high centrifugal force, and having a better responsibility (responseability) beyond the limit of responsibility by the hydraulic control.

If the flight of the helicopter is controlled through the swash plates and the pitch link, the rotor generates vibratory force which vibrates the airframe of the helicopter, the lift of the rotor blades is caused to vary periodically according to rotation angle by the relation between the flying direction of the helicopter and the rotary angular position of the rotor blades, and the combined air vibrating effect of the rotor blades is exerted on the airframe to produce complex vibrational environment. FIG. 8 and 9 show a lift distribution on the rotor blade of the rotor 13 of the helicopter when the rotor blade is turning (rotating) in the flying direction of the helicopter and a lift distribution on the same rotor blade when the rotor blade is turning in a direction opposite to the flying direction thereof.

The control of vibrations through the direct, active control of the swash plate and the pitch link makes the complicated mechanical linkage more complicated, is practically disadvantageous in respect of weight and reliability, is capable of controlling only lower order of vibrations, and is incapable of satisfactorily effectively controlling the vibration generated by a rotor having four or more rotor blades.

The IBC method needs a rotating system including high-capacity hydraulic actuators for moving the rotor blades individually on a mast, which unavoidably increases the weight and makes the mast assembly complicated. The control operation of the IBC method which twists the whole rotor blades is not necessarily efficient.

The rotor provided with a flap is able to vary an effective portion with respect to the direction of a span or to control the effective portion partially. However, the rotor provided with a flap needs electrical control to achieve higher response. Since a large centrifugal force acts on a tip portion of the rotor blade, it is difficult to dispose a heavy device, such as a hydraulic actuator, on the tip portion of the rotor blade, and it is desirable to use a smart material, such as a piezoelectric material. However, piezoelectric materials can be strained only very slightly and hence an additional mechanism for amplifying the strain is necessary. If a flap is combined with the trailing edge of the rotor blade, small and lightweight flap hinges designed to exert only a low frictional resistance against the movement of the flap must be used.

SUMMARY OF THE INVENTION

The present invention has been made in view of the foregoing problems and it is therefore an object of the present invention to provide a rotor blade provided with a rotary spoiler, capable of controlling to reduce noise and vibration by disturbing airstream around the wing surface thereof to vary lift by rotating the rotary spoiler.

According to one aspect of the present invention, a rotor blade comprises a blade body having a wing surface, one or a plurality of rotary spoilers each having a surface forming a portion of the wing surface of the blade body and rotatably supported on the blade body, and rotatably driving means for driving the rotary spoilers. The rotary spoiler is turned to a rotary angular position at which the upper surface of the rotary spoiler protrudes from the wing surface to vary the lift of the blade body by disturbing airstream around the wing surface so that noise and vibration caused by aerodynamic force may be controlled.

In the rotor blade of the present invention, the turning axis of the rotary spoiler may be inclined to a line perpendicular to a chord line of the blade body to make the height of a portion of the rotary spoiler protruding from the wing surface variable for the further effective control of noise and vibration caused by aerodynamic force.

In the rotor blade of the present invention, the driving means for driving the rotary spoiler may comprise an ultrasonic motor. Since energy can be easily supplied to the ultrasonic motor through a slip ring included in a rotor assembly, and a wiring line connected to the ultrasonic motor, a mechanism including the rotary spoiler has a simple construction.

In the rotor blade of the present invention, the blade body may be provided with a plurality of rotary spoilers between a middle portion of the longitudinal blade body and an outer end thereof, and the times for making the rotary spoilers protrude from the wing surface and the respective rotary angular positions of the plurality of rotary spoilers may be simultaneously or individually controlled to achieve a control of a larger aerodynamic force and a desired control of aerodynamic force when the blade body is at a desired rotary angular position.

BRIEF DESCRIPTION OF THE DRAWINGS

The above and other objects, features and advantages of the present invention will become understood from the following description taken in connection with the accompanying drawings, in which.

DESCRIPTION OF THE PREFERRED EMBODIMENTS

Figure 1:
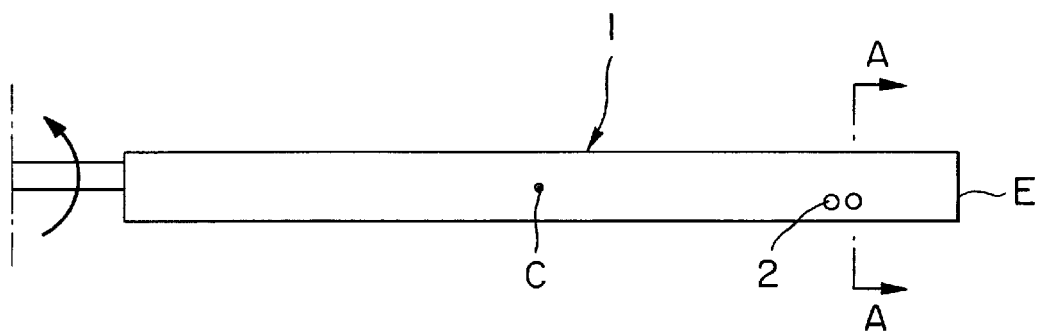
FIG. 1 is a plan view of a rotor blade provided with a rotary spoiler in a first embodiment according to the present invention.
Figure 2:
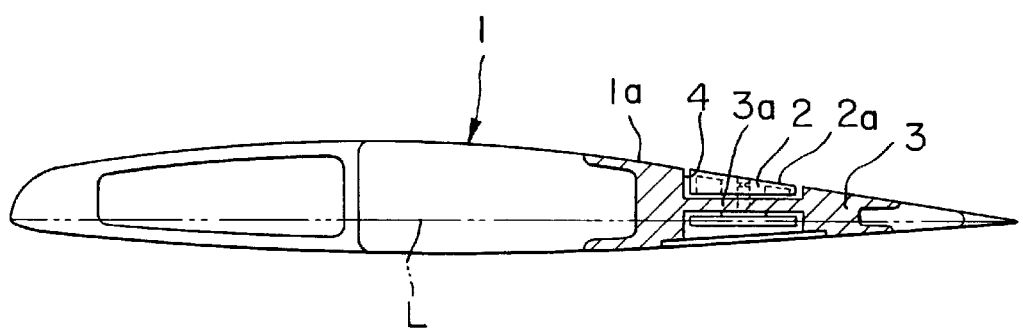
FIG. 2 is an enlarged sectional view taken on line A—A in FIG. 1.

Referring to FIG. 1, a rotor blade 1 in a first embodiment according to the present invention for a two-blade rotor for a helicopter has a longitudinal blade body, and two rotary spoilers 2 arranged at positions near the trailing edge of the rotor blade 1, that is, at portions of the blade body between a middle portion C of the longitudinal blade body and an outer end E thereof, in which the rotary spoilers 2 are expected to exercise their aerodynamic functions effectively. The rotary spoiler 2 is arranged longitudinally at a predetermined or optional interval.

Figure 3:
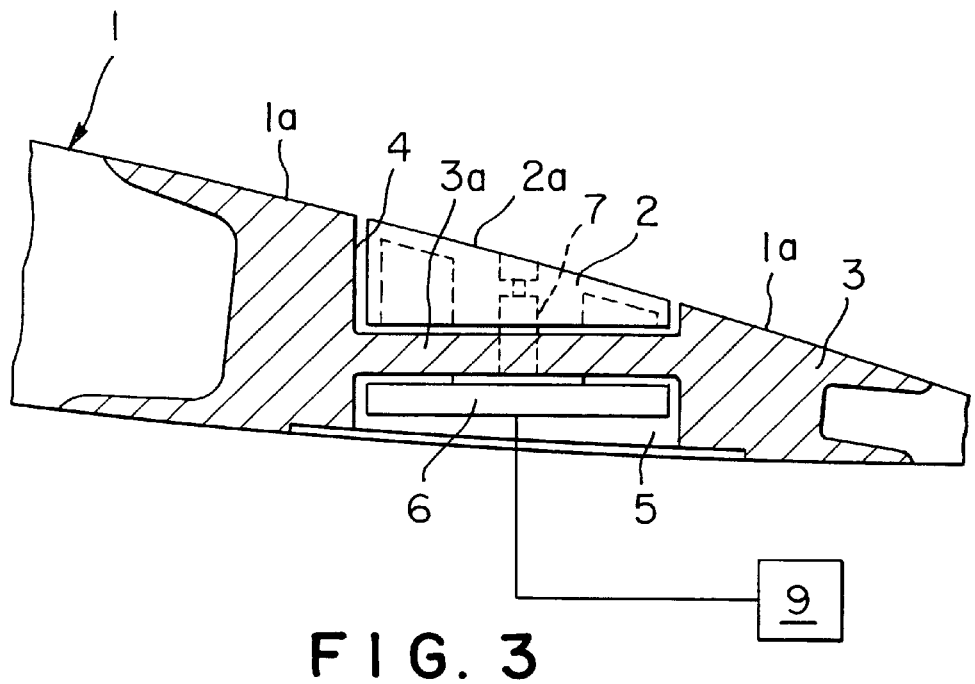
FIG. 3 is an enlarged fragmentary sectional view of the rotor blade of FIG. 1, showing a rotary spoiler in a concealed state

Referring to FIG. 3, each of the rotary spoilers 2 is supported for rotation in an upper recess 4, which is formed in a mounting portion 3 of the blade body of the rotor blade 1 opening in the wing surface 1a of the rotor blade 1. The rotary spoiler 2 is a disk having a substantially triangular cross section and an upper surface 2a smoothly merging into the wing surface 1a of the rotor blade 1. When the rotary spoiler 2 is at a rotary angular position shown in FIG. 3, the upper surface 2a of the rotary spoiler 2 serves as a portion of the wing surface 1a. In this embodiment, a chord length of the rotor blade 1 is 400 mm and the diameter of the rotary spoilers 2 is about 40 mm. The mounting portion 3 of the blade body of the rotor blade 1 has a lower recess 5 corresponding to the upper recess 4. An ultrasonic motor 6 is disposed in the lower recess 5, the output shaft 7 of the ultrasonic motor 6 is extended through a wall 3a between the upper recess 4 and the lower recess 5 into the upper recess 4 and is connected to the rotary spoiler 2 disposed in the upper recess 4. The ultrasonic motor 6 is disposed so that the turning axis of the output shaft 7 thereof is inclined to the wing surface 1a and substantially perpendicular to the chord line of the rotor blade 1. The ultrasonic motor 6 has a driving member made of a piezoelectric material. The ultrasonic motor 6 has satisfactory response characteristics (responseability) and is capable of properly functioning under a high centrifugal force. The ultrasonic motor 6 is connected to a controller 9.

Figure 4:
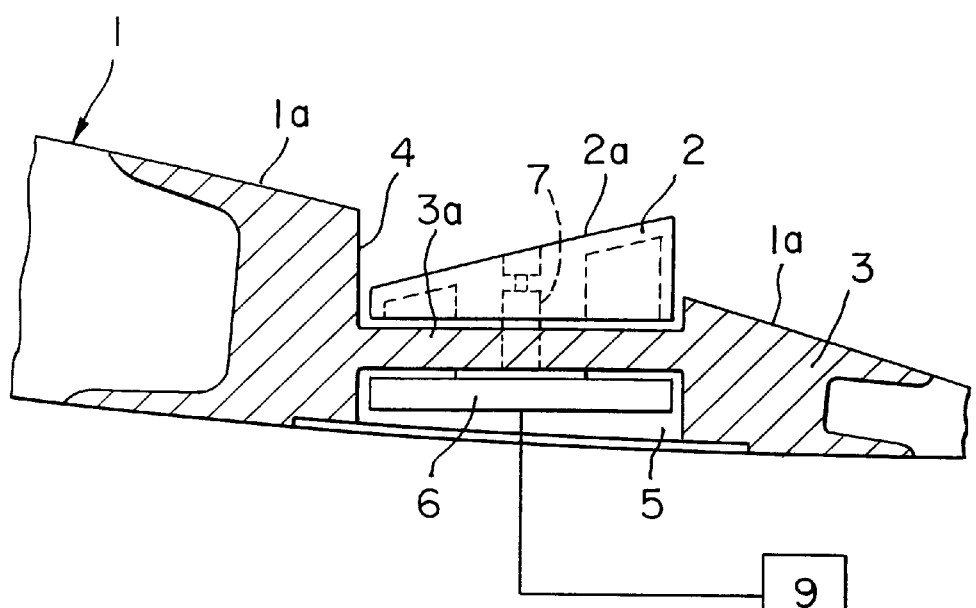
FIG. 4 is an enlarged fragmentary sectional view of the rotor blade of FIG. 1, showing a rotary spoiler in a protruded state.

Each rotary spoiler 2 is moved between a rotary angular position where the rotary spoiler 2 is in a concealed state shown in FIG. 3 and a rotary angular position where the rotary spoiler 2 is in a protruded state shown in FIG. 4. When the rotary spoiler 2 is in the concealed state shown in FIG. 3, the upper surface 2a of the rotary spoiler 2 merges smoothly into the wing surface 1 a of the rotor blade 1 and forms a portion of the wing surface 1a, so that the wing surface 1a of the rotor blade 1 has a normal shape. When the rotary spoiler 2 is in the protruded state shown in FIG. 4, the upper surface 2a of the rotary spoiler 2 protrudes from the wing surface 1a of the rotor blade 1 to exercise its function as a spoiler for disturbing airstreams around the wing surface 1a. When airstreams around the wing surface 1a, i.e., the lifting surface, are thus disturbed by the rotary spoiler 2, the disturbance of the airstreams affect the lift of the rotor blade 1 directly, so that an aerodynamic force generated by the rotor blade 1 is controlled. The aerodynamic force generated by the rotor blade 1 can be controlled by the ultrasonic motors 6 to rotate the plurality of rotary spoilers 2 continuously or stepwise, and simultaneously or in different phases according to the rotary angular position of the rotary blade 1.

Figure 6:
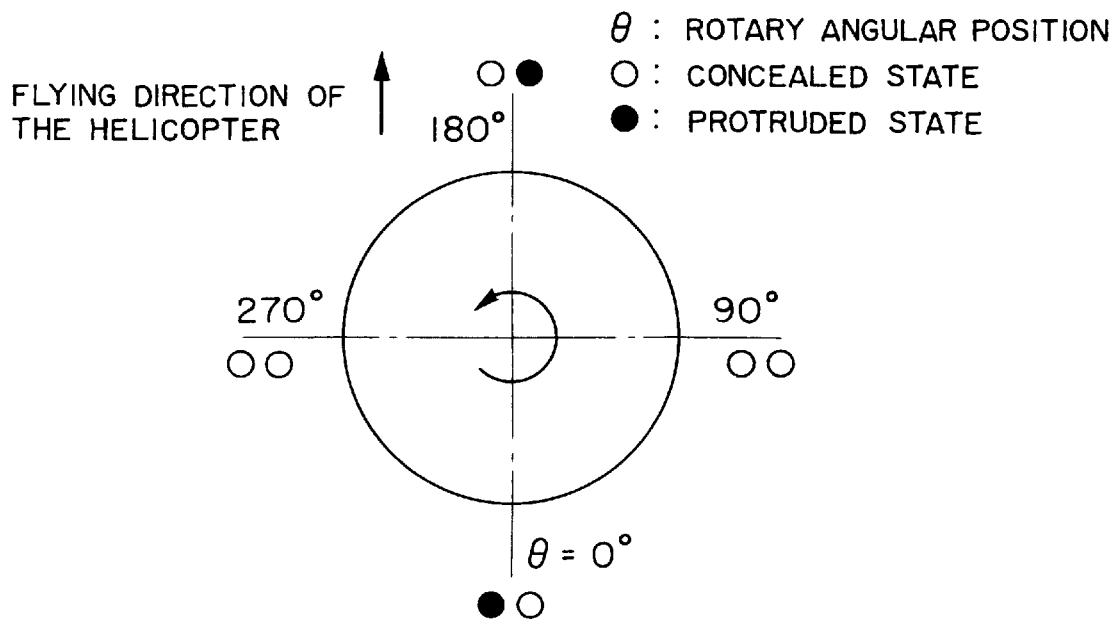
FIG. 6 is a diagram showing the relation between the rotary angular position of a rotor blade and the state of a rotary spoiler.
Figure 7:
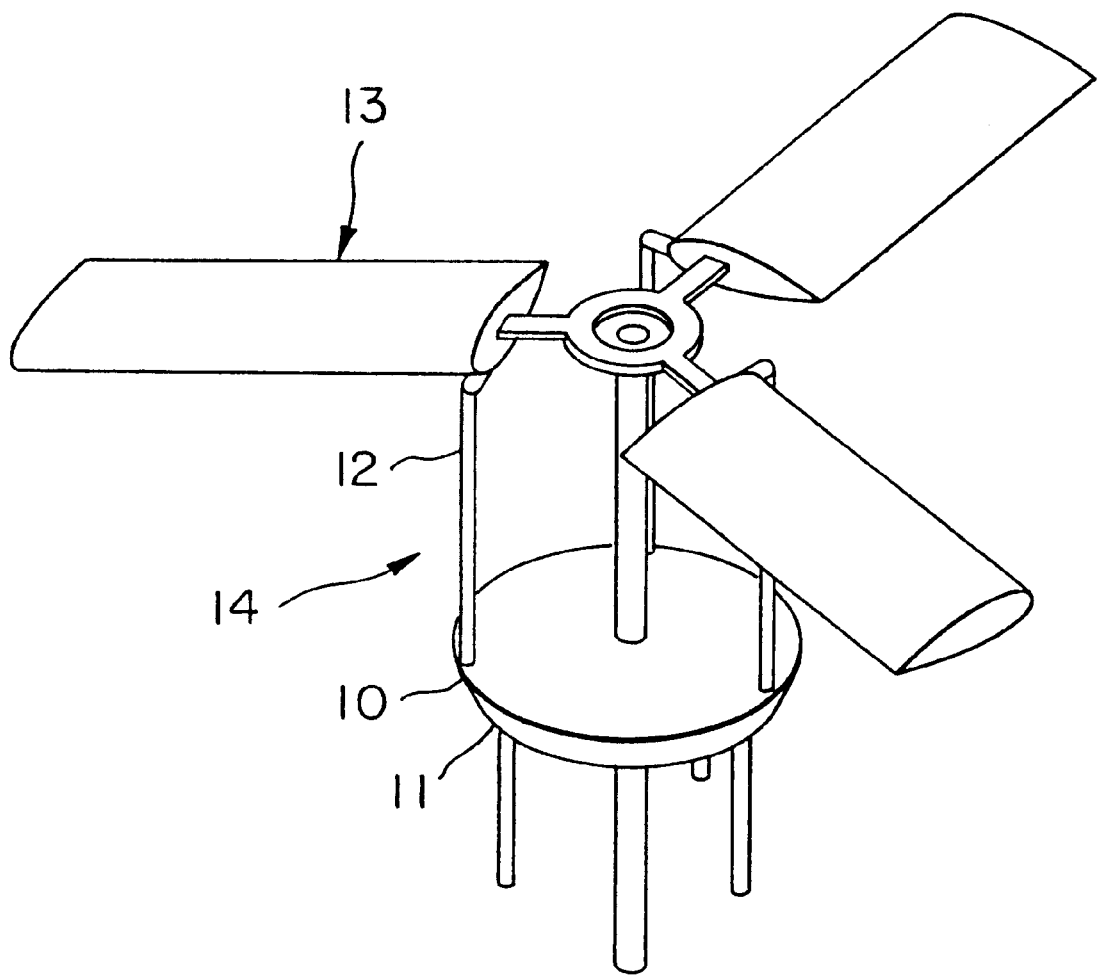
FIG. 7 is a schematic perspective view of a rotor assembly included in a conventional helicopter.
Figure 8:
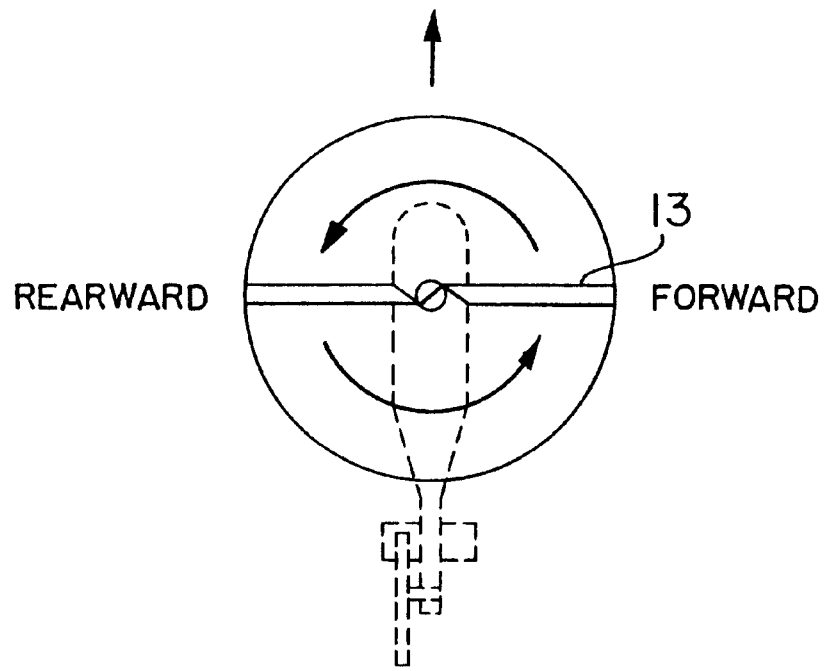
FIG. 8 is a diagrammatic view of assistance in explaining the action of the rotor of a conventional helicopter.
Figure 9:
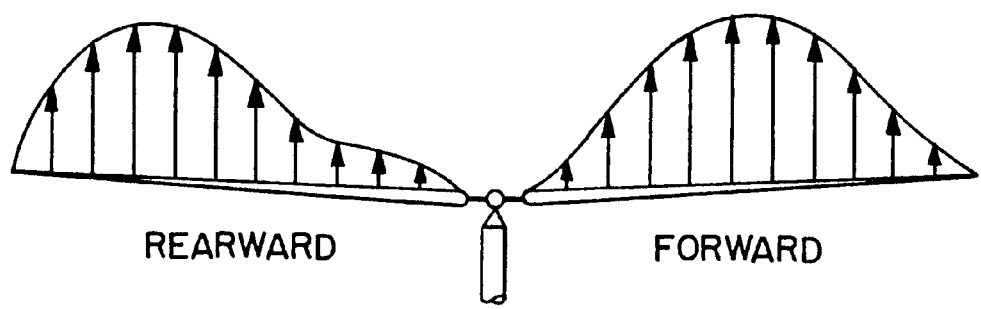
FIG. 9 is a diagram showing a lift distribution on a rotor blade of a conventional helicopter.

When controlling the two-blade rotor at a frequency twice the rotating speed of the two-blade rotor, a method of controlling the aerodynamic force generated by the rotor blade 1 drives the two rotary spoiler 2 for continuous rotation at a rotating speed equal to the rotating speed of the two-blade rotor with a phase difference of 180° between the rotary angular positions of the rotary spoilers according to the rotary angular position of the rotor blade 1. One of the two rotary spoilers 2 is set in the protruded state when the rotor blade 1 is on the front side with respect to the flying direction of the helicopter, and the other rotary spoiler 2 is set in the protruded state when the rotor blade 1 is on the back side with respect to the flying direction of the helicopter as shown in FIG. 6. Thus, each of the two rotary spoilers 2 is set once in the protruded state for every one turn of the rotor blade 1 and hence the rotor blade 1 can be controlled at a frequency twice the rotating speed of the two-blade rotor. The respective positions of the rotary spoilers 2 on the blade body of the rotor blade 1 and the mode of rotation of the rotary spoilers 2 are determined on the basis of the previously determined vibration mode of the rotor blade 1 at the frequency of a vibration in question. More specifically, the rotary spoilers 2 are disposed in a portion of the blade body corresponding to the loop of the vibration mode of the blade body of the rotor blade 1, and the controller 9 actuate each ultrasonic motor 6 for driving each rotary spoiler 2 so that the rotary spoiler 2 is protruded to its highest position at a rotary angular position of the rotor blade 1 where a magnitude of the vibration mode increases to a maximum.

If the rotor blade 1 is employed in a four-blade rotor and the four-blade rotor is controlled at a frequency four times the rotating speed of the four-blade rotor, the phases of rotation of the four rotary spoilers 2 are differentiated at a phase difference of 90° to protrude each of the four rotary spoilers 2 once for every one turn of the rotor blade 1. The respective positions of the rotary spoilers 2 on the blade body of the rotor blade 1 and the mode of rotation of the rotary spoilers 2 are determined by the same method as that applied to the two-blade rotor.

It is known that the most offensive noise generated by the helicopter is sounds (noises) which are generated when the rotor blade 1 crosses air vortices generated by the preceding rotor blade 1. Therefore, noise and vibration caused by aerodynamic force can be controlled by disposing the rotary spoilers 2 at a position of the blade body of the rotor blade 1 which crosses the vortices generated by the preceding rotor blade 1, and controlling the ultrasonic motors 6 by the controller 9 so that each rotary spoiler 2 is protruded at a moment the rotor blade 1 passes the vortices to locally vary the vortices generated by the preceding rotor blade 1 by the rotary spoiler 2.

The foregoing aerodynamic performance of the rotor blade 1 can be expected even if the rotor blade 1 is provided with a single rotary spoiler 2 at a position on the blade body where the amplitude of a low-order vibration of the rotor blade 1 is a maximum instead of the plurality of rotary spoilers 2.

Figure 5:
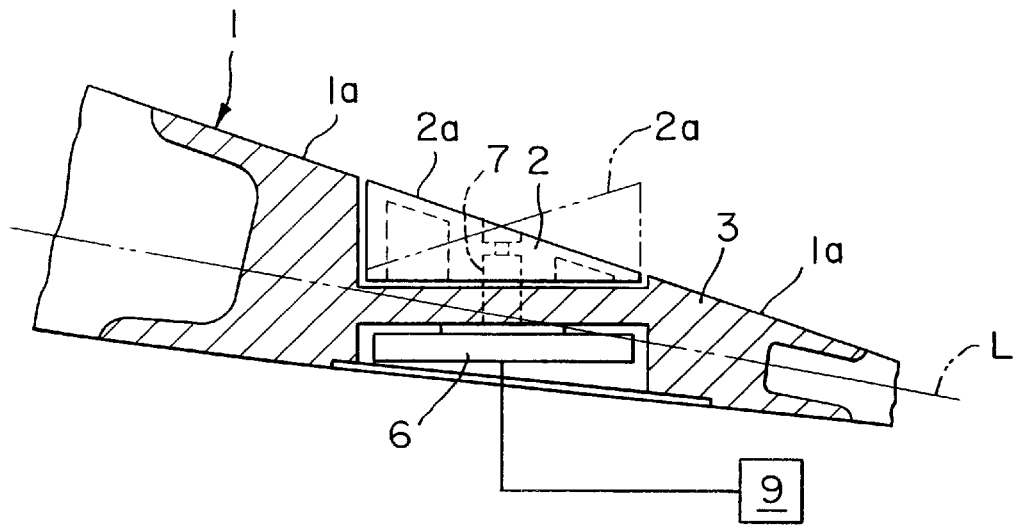
FIG. 5 is an enlarged fragmentary sectional view of a rotor blade in a second embodiment according to the present invention.

FIG. 5 shows a rotor blade 1 in a second embodiment according to the present invention provided with rotary spoilers 2. Each of the rotary spoilers 2 is rotatably supported about an turning axis inclined to a line perpendicular to a chord line of the blade body of the rotor blade 1 so that the rotary spoiler 2 can be protruded more greatly than the rotary spoiler 2 of the first embodiment from the wind surface of the rotor blade 1.

As is understood from the foregoing description according to the present invention, the rotor blade is provided with the rotary spoilers rotatably supported on the blade body thereof so as to be turned by the ultrasonic motors serving as driving means so that the rotary spoilers are protruded from the wing surface of the rotor blade to change the lift of the rotor blade directly by disturbing airstreams around the wind surface. Thus, the aerodynamic force generated by the rotor blade is controlled to reduce the noise and the vibration generated by the aerodynamic force.

The ultrasonic motors serving as the driving means enable the highly accurate control of the rotary spoilers. Since energy can be supplied through the slip ring and the wiring lines to the ultrasonic motors, structures associated with the rotary spoilers have a simple construction.

The rotor blade is provided with the plurality of rotary spoilers between the middle portion of the longitudinal blade body and the outer end thereof, and the plurality of rotary spoilers are controlled simultaneously and/or individually. Each of the rotary spoilers can be made to protrude when the rotor blade is at an appropriate rotary angular position, so that the control of greater aerodynamic force and the delicate control of the rotary spoilers are made by the rotary spoilers protruding at a rotary angular position of the rotor blade where the change of the aerodynamic force is desirable.

Since the rotary spoilers are rotatably supported on the blade body of the rotor blade with the turning axis inclined to a line perpendicular to the chord line of the blade body of the rotor blade, the height of each rotary spoiler protruded from the wing surface can be easily changed for the further effective control of the aerodynamic force.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A rotor blade comprising:

a blade body having a wing surface;

a rotary spoiler provided in said rotor blade and rotatably supported in said rotor blade;

a first upper surface of said rotary spoiler formed by a same contour line of a second upper surface of said rotor blade; and driving means comprising an ultrasonic motor for actuating the rotary spoiler.

2. The rotor blade according to claim 1, wherein a recess is formed in the rotor blade; and the driving means is disposed in the recess.

3. The rotor blade according to claim 1, wherein said ultrasonic motor has as a driving member made of a piezoelectric material.

4. The rotor blade according to claim 1, further comprising:

control means connected to the driving means to control the driving means so that a rotary angular position of the rotary spoiler corresponds to that of the rotor blade.

5. The rotor blade according to claim 1, further comprising control means connected to the driving means, wherein the rotary spoiler is disposed in an upper and rear portion of the rotor blade corresponding to a loop of a vibration mode of the rotor blade, the control means drives the rotary spoiler so that the rotary spoiler is protruded to its highest position at a rotary angular position of the rotor blade where a magnitude of the vibration mode increases to a maximum.

6. The rotor blade according to claim 1, further comprising control means for controlling the driving means, wherein the rotary spoiler is disposed in a portion of the blade body which passes air vortices, and the control means controls the driving means so that the rotary spoiler is protruded at a moment the portion of the rotor blade provided with the rotary spoiler passes the vortices.

7. The rotor blade according to claim 1, wherein the turning the axis of the rotary spoiler is inclined to a line perpendicular to a chord line of the rotor blade.

8. A rotor blade comprising:

a longitudinal blade body having a wing surface;

a plurality of rotary spoilers each having a surface forming a portion of the wing surface of the blade body and rotatably supported on the blade body;

driving means comprising an ultrasonic motor for driving the rotary spoilers; and wherein the plurality of rotary spoilers are disposed between a middle portion of the longitudinal blade body and an outer end thereof.

9. The rotor blade according to claim 8, further comprising:

control means connected to the driving means to control the driving means so that the plurality of rotary spoilers are turned keeping a predetermined phase difference.

10. A rotor blade of a rotorcraft comprising, an upper wing surface with a continuous airfoil contour at a middle portion thereof, and a lower wing surface with a relatively flat surface from a leading edge portion to a trailing edge portion, and a mounting portion with a predetermined thickness provided in an outer end portion of said trailing edge portion in a span wise direction:

a rotary spoiler with a disc shape provided in an upper circular recess formed in said upper wing surface and being horizontally rotatable therein;

an upper rotary spoiler surface of said rotary spoiler being included in the same plane with said upper wing surface when said rotor blade rotates in a normal operation and for producing an air vortex on said upper wing surface by a predetermined upward protrusion by rotating said rotary spoiler when requiring speed changes and noise reduction; and an ultrasonic motor provided in a lower circular recess formed in said lower wing surface for driving said rotary spoiler via an output shaft penetrated through a wall formed between said upper and lower circular recesses so as to effectively decrease noise and vibrations by forming said air vortex on said upper wing surface at an optimum timing.

11. A rotor blade comprising:

a blade body having a wing surface;

a rotary spoiler provided in said rotor blade and rotatably supported on the blade body of said rotor blade with a turning axis perpendicular to the chord line of said blade body of said rotor blade so as to rotate said rotary spoiler horizontally to the chord line;

a first upper surface of said rotary spoiler formed by a same contour line of a second upper surface of said rotor blade; and driving means for actuating said rotary spoiler via said turning axis.

* * * * *

UNITED STATES PATENT AND TRADEMARK OFFICE
CERTIFICATE OF CORRECTION

PATENT NO. : 6,033,180
DATED : March 7, 2000
INVENTOR(S) : Shigeru MACHIDA

It is certified that error appears in the above-identified patent and that said Letters Patent is hereby corrected as shown below:

On title page,

In Field No. [73], change "Fuji Photo Kabushiki Kaisha" to
— Fuji Jukogyo Kabushiki Kaisha —.

Signed and Sealed this

Fifth Day of June, 2001

*Attest:*

*Attesting Officer*

NICHOLAS P. GODICI

*Acting Director of the United States Patent and Trademark Office*